Jan. 19, 1960
R. F. RISSE
2,921,668
ROPE SIDEFRAME CONVEYOR SUPPORTING STAND
Filed Jan. 16, 1958
2 Sheets-Sheet 1
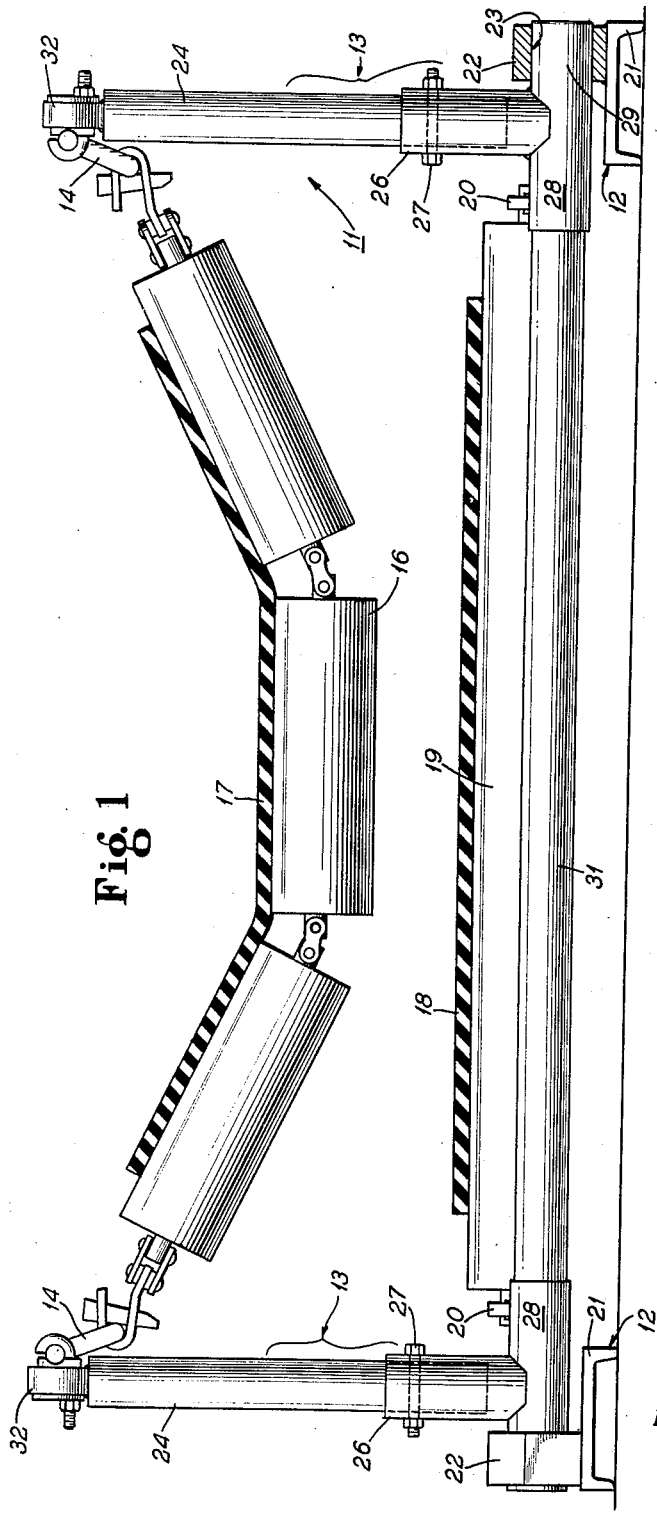
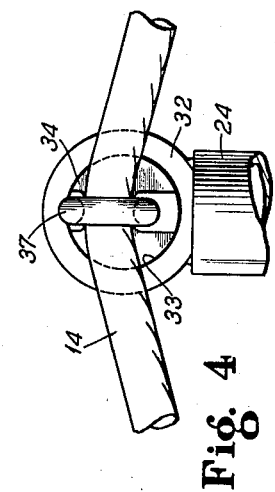
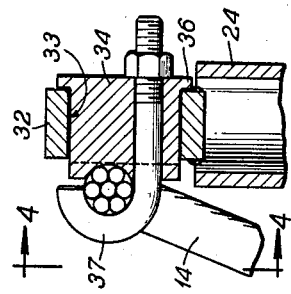
INVENTOR.
Ralph F. Risse
BY *Murray A. Gleeson*
ATTORNEY Jan. 19, 1960 R. F. RISSE 2,921,668
ROPE SIDEFRAME CONVEYOR SUPPORTING STAND
Filed Jan. 16, 1958 2 Sheets-Sheet 2

INVENTOR.
Ralph F. Risse
BY Murray A. Gleeson
ATTORNEY

United States Patent Office 2,921,668
Patented Jan. 19, 1960

2,921,668
ROPE SIDEFRAME CONVEYOR SUPPORTING STAND

Ralph F. Risse, Chicago, Ill., assignor to Goodman Manufacturing Company, Chicago, Ill., a corporation of Illinois Application January 16, 1958, Serial No. 709,250

4 Claims. (Cl. 198—184)

This invention relates to flexible strand sideframe conveyors, sometimes called rope sideframe conveyors, of the general kind shown in Craggs and McCann Patent No. 2,773,257 issued December 4, 1956. Specifically, the invention relates to an improved supporting stand for the rope sideframes.

In a conveyor of this kind, a pair of spaced generally parallel wire ropes are trained along a course and belt-supporting idler assemblies are suspended between them. An important advantage of rope sideframe conveyors is the ability of the ropes to flex and shift and give under varying loads so as to eliminate the effects of shock loading on the mechanical and rubber-like components. One of the characteristics is that the ropes are constantly shifting back and forth along their length, toward the heaviest loaded section of the belt. While the magnitude of this shift is not great, rarely exceeding four inches at any one place, it must be allowed for to obtain the maximum impact absorbing effect from this structure.

The ropes are supported at intervals, by stands, to control the gravity-induced catenary droop. Design of these stands in the past has not included sufficient attention to the shifting characteristics of the ropes. As a result, the stands have usually been rigid affairs with integral feet which tip up and down, sometimes on the ground and sometimes not, with the tilting of the stands. The working or shifting back and forth of the ropes has caused these conventional stands to "walk," to shift sidewise, and in some cases even to fall completely over onto the ground.

The stand of the present invention provides a pivotal or tiltable connection between the base and the upstanding rope supporting arms so that the arms can tilt back and forth, freely relative to the stationary base while still providing proper support for the ropes as they work back and forth along their length.

There is another feature which is just as important as enabling the ropes to shift freely, and that is the ropes should be restrained for movement in the same degree and direction. In other words, it is not good to have one rope shifting forward and the other shifting backward, nor is it good to have one rope shifting farther than the other rope, as either of these conditions would tend to misalign the idler assemblies and detrain the rubber belting. Accordingly, it is another important object of the present invention to provide a tie or torsion bar interconnecting the rope supporting arms so they will be positively restrained for tilting in the same degree and direction and, by reason of clamping engagement with the ropes, they too will be restrained to shifting in the same degree and direction.

Other objects and advantages will be apparent from the following description taken in connection with the drawings in which:

Figure 1 is a cross sectional view of a rope sideframe conveyor showing a preferred embodiment of the present invention;

Figure 3 is an enlarged fragmentary view of Fig. 2 taken along the line 3—3;

Figure 4 is a view of Fig. 3 taken along the line 4—4; and

Like parts are referred to by like reference characters throughout the figures.

Figure 5:
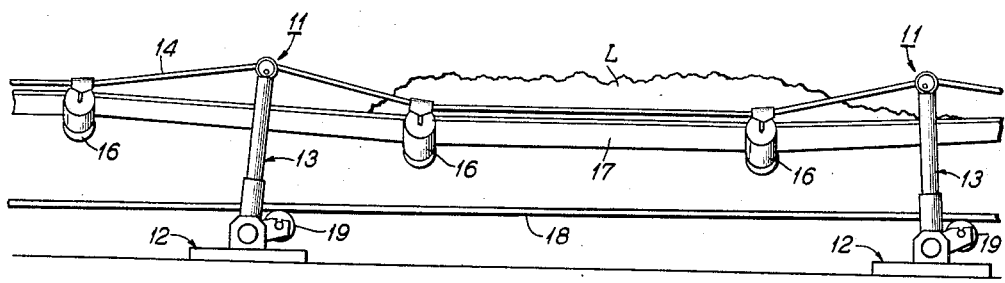
Figure 5 is a side view of a rope sideframe conveyor illustrating the tilting action of the rope supporting stands under the action of a load.

Referring now more particularly to the drawings, we first describe the environment generally, as shown in Fig. 5. Stands 11, 11 are set at intervals along a course, each stand comprising stationary base means 12 and a pair of tiltable upstanding arms 13, the latter supporting a pair of shiftable ropes 14, 14 which serve as flexible strand sideframes and across which are suspended troughing roller assemblies 16. A load-carrying reach 17 of an orbitally movable belt is supported on the troughing rollers and a return reach 18 is supported on return rollers 19 which are carried by the brackets 20 which in turn are mounted as will be subsequently described.

The rollers 16 and 19 do not form an important part of the present invention so will not be dealt with further here. Reference may be had to Craggs and McCann Patent 2,773,257 for additional descriptions.

Referring now to the present invention which is the stand 11, the embodiment shown will now be described. The base means 12 comprises a pair of individual shoes 21 which may be steel channel sections. Atop each, held as by means of welding, is a bearing block 22 with a horizontal bore 23. The bores in the two shoes are aligned.

Each of the supporting arms 13 comprises a pair of telescopically adjustable tubular sections 24 and 26, held at proper adjusted height by a through bolt 27. At the bottom of each section 26, and welded thereto, is a transverse shaft 28 having an external trunnion portion 29, the latter being rotatably journaled within the corresponding bearing bore 23. The return roller supporting bracket 20, above-mentioned, is mounted as by welding on the shaft 28, this being duplicated on both sides of the stand as best shown in Figs. 1 and 2.

The two upstanding rope supporting arms 13, 13 are correlated for tilting movement in the same degree and direction, longitudinally of the ropes 14, 14, by a torsion bar 31 interconnected between the shaft sections 28, 28. It is preferable, but not essential, that the torsion tie bar 31 be coaxial with the tilting axis of the supporting arm, that is the common axis of trunnions 29, 29.

To avoid twisting the ropes (in a vertical plane) as the arms 13, 13 are tilted by the shifting of the ropes, the construction shown in Figs. 3 and 4 may be provided. Atop each arm section 24 is welded a block 32 having a bore 33 which is preferably parallel to the trunnions 29, 29. Within each bore 33 is a clamp body 34 rotatable within the bore and having an outer flange 36 resisting the inward pull of the rope. A J-bolt 37 extends through the clamp body 34 and engages the rope. Thus as the support arms tilt, the clamped portion of the rope remains on an even keel by pivoting or rotating of the clamp within the bore 33.

Figure 2:
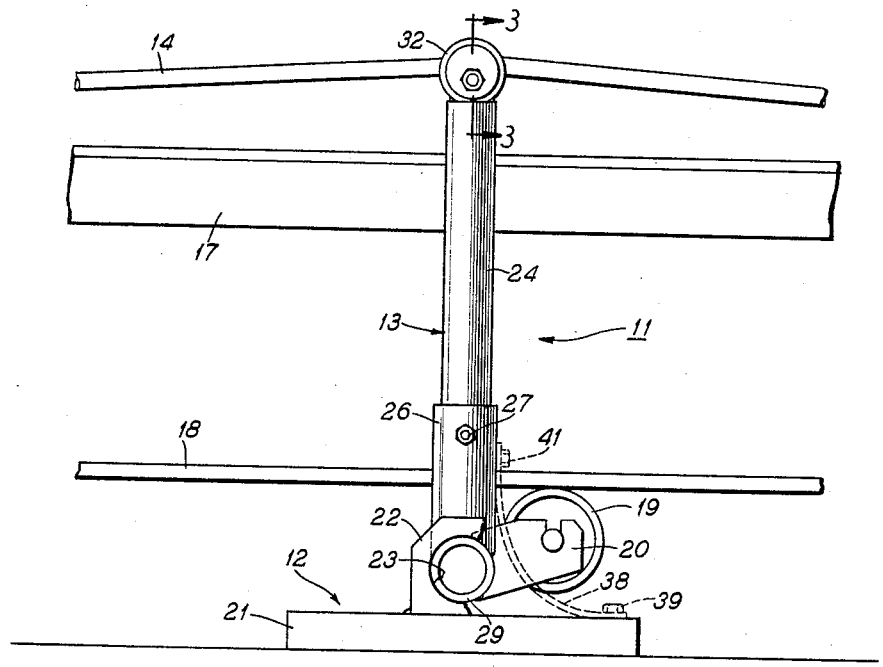
Figure 2 is a side view of Figure 1.

As shown by broken lines in Fig. 2, a spring steel strip 38 may be fastened between the foot 21 and arm section 26, as by bolts 39 and 41, to maintain the arms upright relative to the base prior to attachment to the ropes. The spring strip would of course be sufficiently flexible to enable the arms to tilt easily relative to the base for accomodating the shifting of the ropes. And the steel strip may be employed on one or both sides of the stand as desired.

Figure 5 illustrates how the arms 13 are freely tiltable in the direction of a load L on the belt while leaving the base in stable, flatwise engagement with the ground.

While one form in which the present invention may be embodied has been shown and described it will be understood that various modifications and variations thereof may be effected without departing from the spirit and scope of the invention as defined by the appended claims.

I claim as my invention:

1. A supporting stand for enabling a pair of flexible rope sideframes of a flexible sideframe conveyor to effectively longitudinally shift along a given conveyor course in response to loads being carried thereby; said supporting stand comprising: stationary base means; a pair of elongated substantially rigid supporting arms, said supporting arms being disposed substantially parallel to each other and normally generally vertically positioned in a common plane that extends generally lateral relative to such conveyor course; pivot means pivotally mounting one end portion of each supporting arm to the stationary base means for tilting movement of the supporting arms over a range that extends longitudinally relative to the conveyor course to each side of the said normal generally vertical position of the supporting arms; an elongated substantially rigid tie bar interconnecting the supporting arms to effectively restrict the tilting movement of the supporting arms to the same degree and direction; rope clamping means adjacent the other end portion of each supporting arm, mounting means pivotally mounting each of the rope clamping means on the other end portion of the respective supporting arm to enable a rope that may be clamped thereby to be maintained substantially horizontal throughout the full range of tilting movement of the supporting arms; and resilient means for substantially continuously urging said supporting arms toward the said normal generally vertical position.

2. The supporting stand as set forth in claim 1 wherein said resilient means is interposed between at least one of the supporting arms and the stationary base means.

3. The supporting stand as set forth in claim 1 wherein said mounting means comprises an annular member secured to the other end portion of the respective supporting arm, each of said annular members having an opening therethrough, and a clamp body rotatably journaled in each of said openings, each of said clamp bodies having an outwardly projecting flange engaging the respective annular member for restraining the respective clamp body against movement in a direction that is generally laterally inwardly relative to such conveyor course.

4. The supporting stand as set forth in claim 3 wherein said rope clamping means comprises an elongated longitudinally adjustable clamp carried by each of the rotatably mounted clamp bodies, each of said clamps extending generally laterally inwardly relative to the conveyor course and being disposed in spaced relationship to the rotational axis of the respective clamp body.

References Cited in the file of this patent

UNITED STATES PATENTS

| | | |
|---|---|---|
| 1,313,357 | Watkins | Aug. 19, 1919 |
| 2,773,257 | Craggs et al. | Dec. 4, 1956 |
| 2,805,763 | McCallum | Sept. 10, 1957 |

FOREIGN PATENTS

| | | |
|---|---|---|
| 27,923 | Germany | July 22, 1884 |